Nov. 22, 1955     O. F. A. BIGINELLI     2,724,616
COCK VALVE MORE PARTICULARLY FOR A FIRE EXTINGUISHER
Filed March 6, 1950
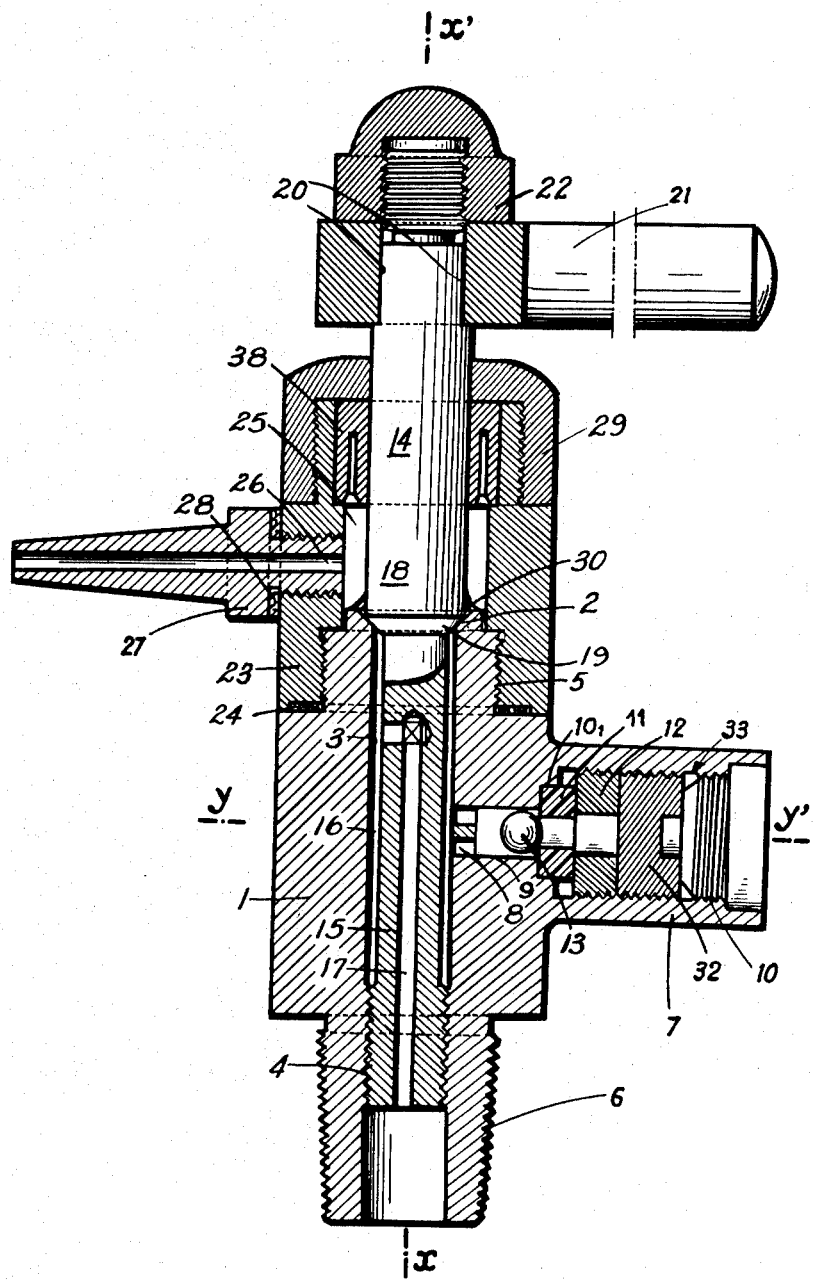
INVENTOR:
ORESTE FLAVIO ALFREDO BIGINELLI
BY: Wenderoth, Lind & Ponack
ATTORNEYS

United States Patent Office 2,724,616
Patented Nov. 22, 1955

2,724,616

COCK VALVE MORE PARTICULARLY FOR A FIRE EXTINGUISHER

Oreste Flavio Alfredo Biginelli, Clermont-Ferrand, France

Application March 6, 1950, Serial No. 147,913

Claims priority, application France December 29, 1949

1 Claim. (Cl. 299—150)

In the extinguishers working with a fluid pressure it is difficult to have a control member of the cock valve type which is perfectly tight. It is for this reason that closing systems of another type insuring a good tightness are often used.

The extinguisher is closed, for example, by a membrane which is torn through a suitable means at the moment of its use.

It may also be closed by a metallic nozzle having no joint and which is broken in order to set the device in action.

Other extinguishers comprise a glass bulb which is sealed and part of which is broken in order to set free the contents.

All these devices show a tightness which may be perfect and they work through the breaking of the vessel which contains the extinguishing fluid or of a member integral with said vessel.

These devices yield good results in the case of extinguishers having a small capacity such as extinguishers for motor cars. On the contrary, they show the serious drawback that they involve the complete draining of the apparatus which has been set in action. Now it occurs frequently that a fire is extinguished after the first moments of the attack through the extinguisher; in this case it is of interest to stop the working of the extinguisher more particularly when the apparatus works through a projection of a liquid in a room where such a projection may cause damages. Finally, the possibility of interrupting and resuming the operation of the extinguisher may be useful when there are a plurality of seats of a fire to be attacked.

In order to avoid these drawbacks it was already suggested, more particularly for extinguishers of more than 3 litres, to provide the apparatus with a needle or flap cock-valve in order to make it possible to control or interrupt the output.

But owing to the inner pressure, to the trepidations to which the extinguisher may be subjected as, for example, in the case of vehicles, and to the differences of dilatation of the metals of which the valve is made, it is difficult to maintain this sealing member in a tight condition.

The above mentioned drawbacks occur not only in the case of extinguishers but also in the case when the valve is used for closing a pressure gas container such as a gas bottle.

The present invention has for its object to remedy the imperfections of the above mentioned devices.

The invention relates to a cock-valve, more particularly for a fire extinguisher, characterized by the fact that the sealing member is soldered on its seat which makes it possible to insure the tightness of the vessel by means of the soldering and to break said soldering at the moment of use through the simple actuation of the valve.

The invention also relates to a cock-valve, more particularly for a fire extinguisher, characterized by the fact that the sealing member is accessible from the outside when seated which makes it possible exactly to apply a soldering seam on the joint between said sealing member and its seat.

In accordance with characteristic features of the invention the cock-valve is provided with a valve device for the introduction of gas which can be closed itself through soldering after the introduction of the gas into the vessel.

According to another feature of the invention the sealing member of the cock-valve is formed of a rod with a conical shoulder screwed into the body of the cock-valve below said shoulder, said rod being capable of applying against a corresponding bearing surface of the seat-forming body and of being secured thereto through a soldering seam.

The invention also covers the hereinafter described features and their various possible combinations.

A cock-valve made in accordance with the invention is shown by way of example in the single figure of the accompanying drawing which is an axial section through the cock-valve.

The cock-valve made in accordance with the invention comprises the following essential members.

(a) The valve body 1 which is provided along its axis with a cylindrical bore 3 extended downward through an internally threaded part 4 and upward through a conical seat-forming part 2.

Externally said body comprises in its upper part a cylindrical externally threaded bearing surface 5 and in its lower part a conical externally threaded bearing surface 6 through which it is fastened to the neck of the vessel.

In addition, the body 1 is provided with a side pipe branch 7 integral with it or welded thereon and provided along an axis YY' which is perpendicular to the axis XX' of the cock-valve with internal threads 10 on the outside and with a cylindrical bore 9 having a smaller diameter and forming a chamber communicating with the cylindrical bore 3 through holes 8.

(b) A valve device for the introduction of gas formed of a ball 13 located in chamber 9 and forming a sealing valve and of a washer 11 of plastic material held fast in a step $10_1$ of the pipe branch through a screw member 12 provided with an axial hole and screwed into the tapping 10, said washer forming a seat for ball 13.

(c) A sealing member formed of an axis 14 which comprises in its lower part a shank externally threaded in accordance with the tapping 4 of the body. Above said threaded part a smooth cylindrical part 15 is located in bore 3 of the body and has a diameter which is smaller than the diameter of said body so as to provide an annular space 16 between the smooth part 15 and said bore 3. The threaded shank and the cylindrical part 15 are provided along the axis with a hole 17 opening at right angles into the annular space 16. In its upper part the axis comprises a cylindrical part having a larger diameter than part 15 and connected to the latter through a conical shoulder 19 fitted to seat 2 of the body. In its upper part the cylindrical part 18 comprises two flats 20 serving for locking the operating handle 21. The axis terminates in its upper part in a threaded portion on which a nut 22 is screwed for locking the handle.

(d) A sealing head 23 screwed on the upper threaded portion 5 of the cock-valve body, the tightness between both parts being insured through a gasket 24. Head 23 is bored so as to provide around the cylindrical part 18 of the axis an annular space 25 into which the bore 26 of a nose 27 opens which is screwed perpendicularly to the axis with the interposition of a gasket 28. Head 23 is bored in its upper part to a larger diameter in order to receive a fitting 38 arranged around part 18 of the axis, said fitting being maintained by a cap-nut 29 screwed into the upper end of the head.

In the above described cock-valve the threadings 4 and 6 are made in contrary directions so that by screwing the hollow rod 15 into the tapping 4 one tends to tighten the screwing of the cock-valve through its threading 6 into the neck of the vessel.

Likewise, the threading 5 of the cock-valve body is in the contrary direction with respect to that of threading 6 in order that the screwing of head 23 into body 1 also tends to tighten the screwing of the cock-valve into the vessel.

The above described cock-valve is mounted and used as follows.

Since the body 1 of the cock-valve is bare axis 14 is screwed through its externally threaded lower part into the tapping 4 of the body until the conical shoulder 19 comes to apply against the conical seat 2 of the cock-valve body.

Axis 14 is then tin soldered to the cock-valve body by means of a soldering seam 30 arranged immediately above seat 2.

One then mounts into axis 14 the tightly sealing head 23 with its nose 27, then the cap-nut 29, the operating handle 21 and the locking nut 22.

Ball 13 and seat 11 are then arranged in the pipe branch 7, the seat being locked through the screw element 12.

The cock-valve is then screwed home through its lower externally threaded part 6 into the neck of the vessel which is to contain extinguishing fluid. Then pipe branch 7 is connected to a piping for the gas or liquid under pressure which is to be introduced into the vessel. Said gas or liquid enters the vessel by passing through the axial hole a screw 12 and seat 11 through chamber 9, holes 8, annular space 16 and axial conduit 17.

At the end of the filling operation when the gas pressure inside the vessel will have attained the desired value it is sufficient to disconnect pipe branch 7 from the gas supply piping; ball 13 will then be applied against its seat 11 through the internal pressure of the vessel and thus form a tight seal.

In addition, a plug 32 will be screwed into tapping 10 of pipe branch 7 and soldered in said tapping through a soldering seam 33.

The closing of the vessel will also be obtained in a perfectly tight manner through the soldering 30, on the one hand, and through the plug screwed into and soldered in pipe branch 7, on the other hand.

In order to set the extinguisher in operation axis 14 will be rotated by means of handle 21 in such a direction that said axis is unscrewed from tapping 4. The tin soldering seam 30 will be broken, the conical shoulder 19 moves away from its seat 2 and allows the extinguishing fluid to pass which escapes from the vessel through axial conduit 26 of nose 27.

If the user wishes to interrupt the outlet of the extinguishing fluid he acts on handle 21 in the direction which tends to screw rod 14 into tapping 4 whereby the conical shoulder 19 is applied against its seat 2 and interrupts the outlet of said extinguishing fluid.

The above described cock-valve can be used not only in the case of fire extinguishers but in all the cases where it is desired very tightly to seal a vessel containing a fluid under pressure which must remain in said vessel for a long time before being used.

Thus, the above described cock-valve offers the following technical advantages.

(1) When the extinguishing apparatus is not in use the sealing of the vessel which contains the extinguishing fluid is obtained by means of solderings 30, 33 which insure a complete tightness of said sealing.

(2) The user which uses the apparatus in order to extinguish a seat of a fire can easily break soldering 30 through simply acting upon handle 21. The setting in operation of the apparatus is thus very rapid.

(3) If the user wishes to stop the projection of the extinguishing fluid either because the fire is extinguished or because it is necessary to throw the extinguishing fluid into another seat of the fire at some distance from the first one the only thing he has to do is to actuate handle 21 in order to interrupt the outlet of the fluid. It is thus possible to avoid damaging a room or objects through the complete draining of the vessel and to pass from one to another seat of the fire.

I claim:

In a valve particularly for a fire extinguisher the combination comprising a valve body having a bore the lower end of which is threaded, an upwardly opening conical seat located at the upper end of said bore, a sealing head removably attached to said body and covering said seat, a rod slidable in said sealing head and having a downwardly and inwardly tapering conical shoulder, the outside diameter of said conical shoulder being less than the maximum diameter of said conical seat, said rod having below said conical shoulder a smooth portion of a smaller diameter than the diameter of said bore thereby providing between said smooth portion and said bore an annular space, said rod having a threaded portion below said smooth portion by which it is screwed into the threaded lower end of said bore, said rod having an axial conduit opening downwardly from the lower end of said rod and opening laterally into said annular space, said rod and said sealing head defining an annular chamber between them, a projection nozzle fixed to said sealing head and opening into said annular chamber, said rod engaging said seat by said conical shoulder and being applied thereon in order to close said valve and forming an upwardly opening groove between said conical shoulder and said seat and accessible from the exterior when said sealing head is removed, a soldering line applied to said upwardly opening groove in order to close it tightly, and means for controlling the rotation of said rod about its axis to break said soldering line when opening said valve.

References Cited in the file of this patent

UNITED STATES PATENTS

| | | |
|---|---|---|
| 11,332 | Spratt | July 18, 1854 |
| 179,034 | Leland | June 20, 1876 |
| 206,429 | Field | July 30, 1878 |
| 920,729 | Cooper | May 4, 1909 |
| 1,246,164 | Ruegger | Nov. 13, 1917 |
| 1,502,650 | Ashe | July 29, 1924 |
| 2,051,589 | Allen | Aug. 18, 1936 |
| 2,236,961 | Salmond | Apr. 1, 1941 |
| 2,374,690 | Laue | May 1, 1945 |

FOREIGN PATENTS

| | | |
|---|---|---|
| 177,994 | Switzerland | 1935 |
| 581,386 | Great Britain | 1946 |